Figure 1:
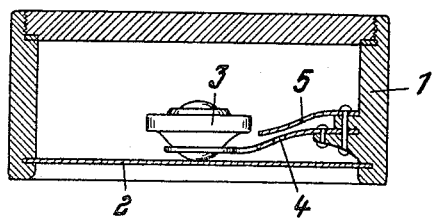

Inventor
Wilhelm Rudolph
by Knight Bro
attorneys

Patented Aug. 5, 1924.

1,503,599

UNITED STATES PATENT OFFICE.

WILHELM RUDOLPH, OF KIEL, GERMANY, ASSIGNOR TO THE FIRM SIGNAL GESELLSCHAFT M. B. H., OF KIEL, GERMANY.

PROTECTIVE DEVICE IN SOUND-SIGNALING APPARATUS.

Application filed February 4, 1921. Serial No. 442,581.

*To all whom it may concern:*

Be it known that I, WILHELM RUDOLPH, a citizen of the German Republic, residing at Kiel, county of Schleswig-Holstein, State of Prussia, Germany, have invented certain new and useful Improvements in Protective Devices in Sound-Signaling Apparatus (for which I have filed an application in Germany on November 27, 1917, Patent No. 345,793), of which the following is a specification.

In sound signaling apparatus which are at times subjected to severe and particularly to abrupt pressure impulses it very frequently happens that parts of the apparatus are torn off or destroyed by the effect of the forces imparted to them. Thus in the case of subaqueous sound receivers which comprise a diaphragm abutting on the outer water and a detector (a microphone) directly or indirectly attached to this diaphragm it very often occurs that in cases of violent impulses caused by explosions in the water the detector is separated as a whole from the diaphragm or is shattered in itself.

The reason for this is that on account of the flexibility of the outer diaphragm vibrated by the sound, the masses of the detector are subjected for a certain period to the accelerating effect of the explosion impulse and are suddenly checked when the limit of the flexure of the diaphragm is reached. The inertia of the detector then acts as a destructive force. On account of the acoustic conditions to be satisfied it is extraordinarily difficult to make the parts that are subjected to such severe stresses through the inertia of the masses of the detector strong enough to enable them to resist the very considerable strain imposed upon them at the moment when their movement is suddenly checked.

In accordance with the invention an improvement in this direction is accomplished by not connecting the parts of the sound apparatus that are associated with the outer vibrating plate rigidly to this plate or diaphragm as hitherto (as by screws or soldering etc.); but by connecting them resiliently or yieldingly as by a spring member or members. A preferred arrangement is one in which the said parts are pressed by a spring against the outer vibrating plate or diaphragm, the point where the spring is applied being so arranged that it lies between the point where the diaphragm bears against its cooperating part and the portions of this part that are sensitive to shock or sudden violent impulses. By this arrangement the accelerated masses of the internal portions of the sound apparatus are enabled, at the instant when the bulging movement of the external diaphragm stops, to continue their movement in the direction opposite to that of the force of the spring that presses them against the diaphragm, so that the kinetic energy residing in them is gradually converted into potential energy and partly dissipated during the gradual flexure of the said spring. The moment after the said bulging movement ceases, the parts flung away from the diaphragm are restored to their former position relative to the diaphragm by the spring action of their supporting member.

It is true that the proposal has already been made to press so-called pressure microphones against their diaphragm by a spring stop. But in these known arrangements the force of the spring is applied to the side of the microphone opposite to that adjacent the diaphragm, and thus all the parts of the microphone that are sensitive to shock and pressure impulses are subjected to the full effect of these impulses, since they are situated between the diaphragm and the stop.

In accordance with the invention the energy consuming effect of the spring member may be still further enhanced by associating it with damping contrivances. To prevent these damping contrivances from interfering with the sound vibrations of the apparatus they are preferably arranged to occupy a position in which they only touch the spring microphone pressing member after the microphone is lifted clear of the diaphragm.

Two constructional forms of devices arranged in accordance with the invention are shown in the drawing.

Figure 2:
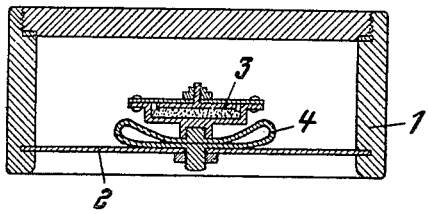

Fig. 1 showing a microphone pressed against the diaphragm of the apparatus by spring fixed to the casing of the same and Fig. 2 showing a spring member supported entirely by the diaphragm.

Arranged in the box 1, which is closed by the vibrating diaphragm 2, is a microphone 3. This latter is pressed against the vibrating diaphragm 2 by the spring 4. The spring 5 is a damping member that touches the spring 4 and damps its movements when it, or the button that it presses against the diaphragm, is moved clear of the diaphragm. The arrangment according to Fig. 2 differs from that of Fig. 1 only in the fact that the spring that presses the microphone against the diaphragm is not attached to the body of the box, but is closed in itself and carried by the diaphragm. The spring is arranged in this way in order to prevent the sound vibrations of the diaphragm being affected by the contact between the microphone and the diaphragm interfering with the flexures of the latter. With this arrangement care must be taken that the tuning of the spring 4 together with the associated masses is as remote as possible from the frequency or group of frequencies of the signals to be received. A preferred arrangement is one in which the tuning of the vibrating system formed by the spring 4 and the associated masses is as high as possible in comparison with the frequencies in question.

The arrangement in which the invention consists permits of the widest application in all sound apparatus, no matter whether the apparatus in question is intended for the sending out or receiving of sound waves. It is not limited to sound apparatus for certain mediums only, but can be employed with equal advantage in liquids and gases.

I claim:

1. In sound apparatus, in combination, a vibratory member abutting on the sound propagating medium, a device comprising parts sensitive to shocks; and resilient means adapted to normally support said device in sound transferring relation against said vibratory member, but to permit it to move bodily therefrom without subjecting it as a whole to crushing forces when said vibratory member is subjected to abnormal shocks.

2. In sound apparatus, in combination, a vibratory member abutting on the sound propagating medium, a device comprising parts sensitive to shocks; and a spring member adapted to normally support said device in sound transferring relation against said vibratory member, but to permit it to move bodily therefrom without subjecting it as a whole to crushing forces when said vibratory member is subjected to abnormal shocks.

3. In sound apparatus, in combination, a vibratory member abutting on the sound propagating medium, a structure sensitive to shocks, and resilient means normally holding a portion of said structure in contact with said vibratory member but adapted to permit the movement of the whole structure bodily away from said vibratory member without subjecting it as a whole to crushing forces when the latter is subjected to abnormal shocks.

4. In sound apparatus, in combination, a vibratory member abutting on the sound propagating medium, a structure sensitive to shocks, and a spring member normally holding a portion of said structure in contact with said vibratory member but adapted to permit the movement of the whole structure bodily away from said vibratory member without subjecting it as a whole to crushing forces when the latter is subjected to abnormal shocks.

5. In sound apparatus, in combination, a vibratory member abutting on the sound propagating medium, a microphone, and resilient means normally retaining one electrode of said microphone in contact with said vibratory member but adapted to permit the movement of the complete microphone body away from said vibratory member without subjecting it as a whole to crushing forces when the latter is subjected to abnormal shocks.

6. In sound apparatus, in combination, a vibratory member abutting on the sound propagating medium, a structure sensitive to shocks having a portion normally in contact with said vibratory member and another portion freely vibratable, and resilient means normally retaining said first-named portion in contact with said vibratory member but adapted to permit the movement of the whole structure bodily away from said vibratory member when the latter is subjected to abnormal shocks.

7. In sound apparatus, in combination, a vibratory member abutting on the sound propagating medium, a microphone having one electrode normally in contact with said vibratory member and the other electrode freely vibratable, and resilient means normally retaining the first-named electrode in contact with said vibratory member but adapted to permit the movement of the complete microphone bodily away from said vibratory member when the latter is subjected to abnormal shocks.

8. In sound apparatus, a vibratory member abutting on the sound propagating medium, a device comprising parts sensitive to shocks, a spring adapted to carry the said device and to press it against the said vibratory member, the said spring being applied to a part of the said device that is located between the said vibratory member and the said senstive parts, and damping means adapted to affect the said spring.

9. In sound apparatus, a vibratory member abutting on the sound propagating medium, a device comprising parts sensitive to shocks, a spring adapted to carry the said device and to press it against the said vibratory member, the said spring being applied to a part of the said device that is located between the said vibratory member and the said sensitive parts, and damping means adapted to affect the said spring after said device is moved clear of the said vibratory member.

In testimony whereof I affix my signature in presence of two witnesses.

WILHELM RUDOLPH.

Witnesses:
LEONID ADELMANN,
FERDINAND SCHENKELBERGER.